INVENTORS
PAUL F. G. HOLST.
LOREN R. KIRKWOOD.
BY H. S. Grover
ATTORNEY

July 18, 1950 | P. F. G. HOLST ET AL | 2,515,225

TRANSCEIVER HAVING SWITCH CONTROLLED FREQUENCY COMPENSATOR

Filed Dec. 30, 1944 | 3 Sheets-Sheet 2

INVENTORS
PAUL F. G. HOLST.
LOREN R. KIRKWOOD.
BY H. S. Grover
ATTORNEY

July 18, 1950 — P. F. G. HOLST ET AL — 2,515,225

TRANSCEIVER HAVING SWITCH CONTROLLED FREQUENCY COMPENSATOR

Filed Dec. 30, 1944 — 3 Sheets-Sheet 3

INVENTORS
PAUL F. G. HOLST
LOREN R. KIRKWOOD.
BY H. G. Grover
ATTORNEY

Patented July 18, 1950

2,515,225

UNITED STATES PATENT OFFICE 2,515,225

TRANSCEIVER HAVING SWITCH CONTROLLED FREQUENCY COMPENSATOR

Paul F. G. Holst and Loren R. Kirkwood, Oaklyn, N. J., assignors to Radio Corporation of America, a corporation of Delaware Application December 30, 1944, Serial No. 570,670

8 Claims. (Cl. 250—13)

This invention relates to improvements in radio transceivers, and particularly to ultra high frequency transceivers employing cavity tuned circuits and operating in a frequency range of the order of 1000 megacycles and higher.

The term "transceiver" is used herein to designate radio apparatus which can alternately transmit or receive radio waves by means of the same electron discharge device circuit whose function is changed for the two different conditions of operation.

It has been suggested, heretofore, to provide transceivers operating in the ultra high frequency range with a cavity tuned circuit having associated therewith a common oscillator vacuum tube which can be used as a transmitting oscillator and also as a super-regenerative detector. Reference is made to copending application Serial No. 487,722, filed May 20, 1943, by Goddard and MacLean, which describes such a transceiver. In the system of this copending application, a switch is used to change from the receiving condition to the transmitting condition, and automatic means is provided for compensating for the unavoidable change in the oscillator frequency of the cavity tuned circuit when the system is changed from the receiving condition to the transmitting condition. The automatic frequency compensator, in its essentials, comprises a solenoid controlling a plug adapted to enter the cavity in a suitable location. A relay is employed under control of the switch to enable the system, remotely controlled, to change from the receiving to the transmitting condition.

Characteristics of the particular system just described are that the frequency of reception is adjusted to one side of the transmitter frequency only and therefore the transmitter frequencies at any two transceivers in communication with each other must be set almost exactly alike, and the vacuum tubes used must not only be of the same type but they must change very much in like manner with change in operating conditions. It will thus be seen the components of the equipment and its adjustments are rather critical.

The present invention concerns improvements in the foregoing type of ultra high frequency transceiver which utilizes a cavity tuned circuit and an automatic frequency compensation feature. Some of the objects of the present invention are (1) to provide a transceiver which permits a maximum degree of flexibility during usage; (2) to provide a transceiver which is so adjusted that reception is possible over a desired range on both sides of the transmitter frequency, and (3) to provide a transceiver which is more compact, lighter in weight, and more economical to use than the foregoing described system.

A feature of the present invention comprises the insulation plug enclosing a metal rod, and the associated mechanical elements employed for changing the frequency of the cavity resonator.

Another feature is the arrangement which enables a single relay to effect frequency compensation, and also switch the circuit connections for changing the operation of the transceiver from the receive to the transmit condition.

In the system of the invention, the same lighthouse oscillator tube is used both as an anode modulated transmitting oscillator and as a super-regenerative detector. When two such transceiver units are in communication with each other, it is necessary that the receiving frequency of each unit be adjusted to the transmitter frequency of the other unit. Because each transceiver wil shift its frequency slightly when the unit changes from the transmission condition to the reception condition, and vice versa, and since neither the transmitter nor the receiver frequency will be absolutely constant during operation, it is essential to provide apparatus of this type with some arrangement which will permit the operators to maintain the transceivers tuned to each other. The operator at the transceiver unit which is at that moment in the receiving condition is the logical person to determine whether or not the transmitter and receiver frequencies are alike or matched, and for this reason he should be able to adjust the receiver frequency to the incoming transmitter frequency radiated from the remote transceiver. It is important, however, that the adjustment of the receiver tuning should not alter the frequency of transmission at the same transceiver, since otherwise the operators at the different transceivers might have to hunt for each other. The present invention enables the transceiver to operate at a fixed transmitter frequency while the frequency of reception may be changed manually over a narrow frequency range located on both sides of the transmitter frequency.

A more detailed description of the invention follows in conjunction with drawings, wherein.

Figures 1, 1A:
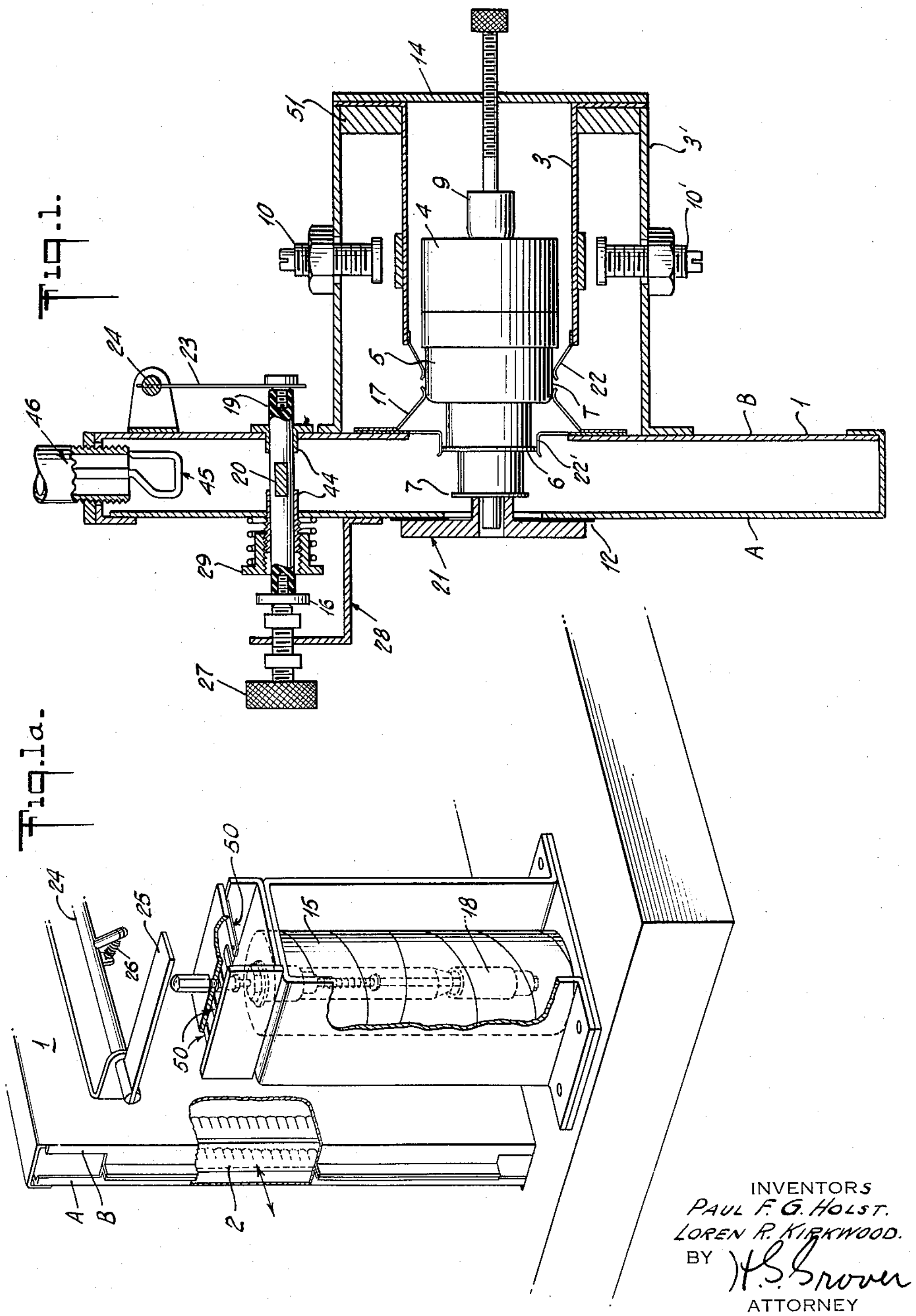
Fig. 1 illustrates, in section, certain mechanical details of the ultra high frequency transceiver system of the invention.
Fig. 1a illustrates in perspective and with more detail the mechanical features of the relay effecting the control of the frequency compensation and the switching of the circuits.
Figure 2:
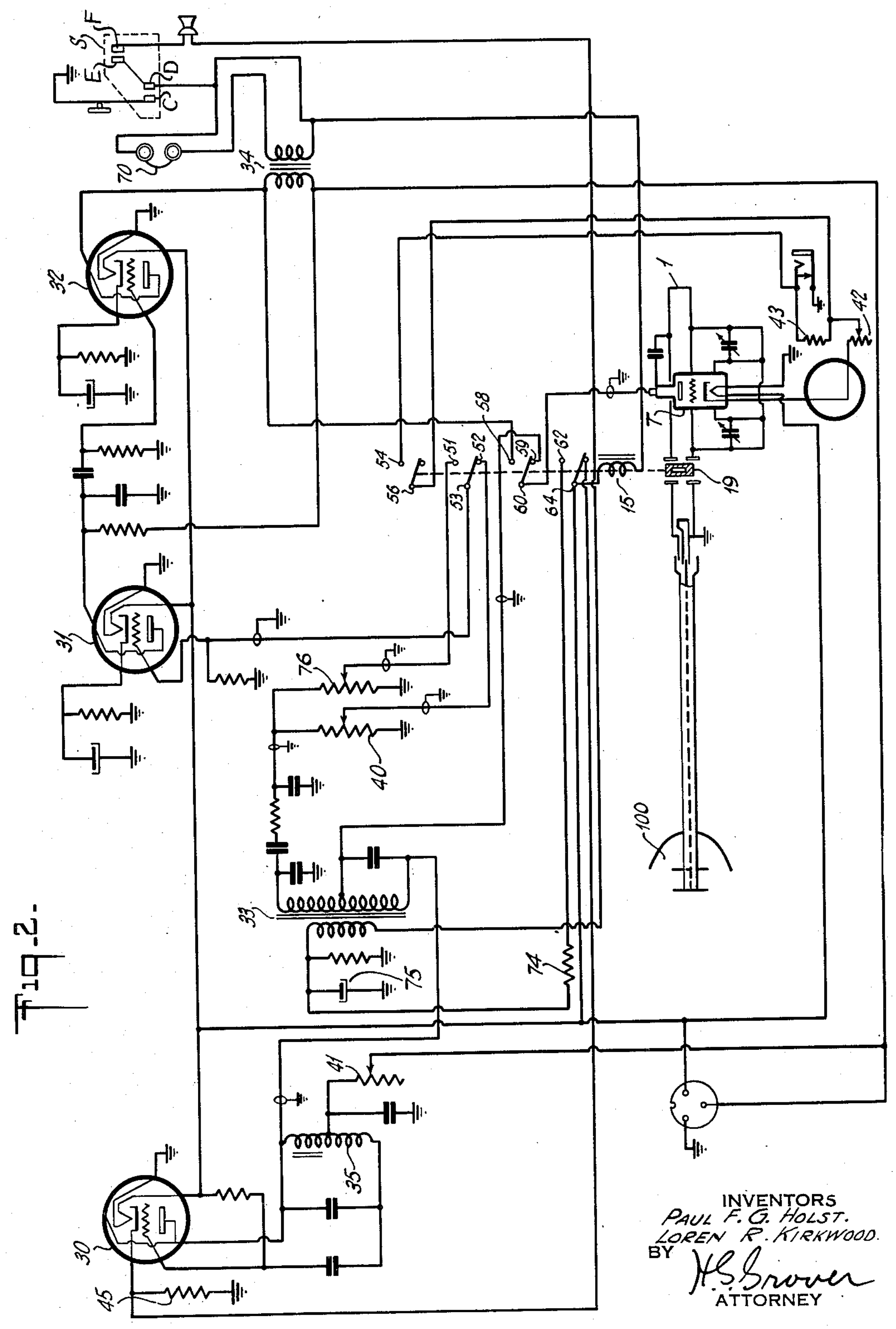
Figure 3:
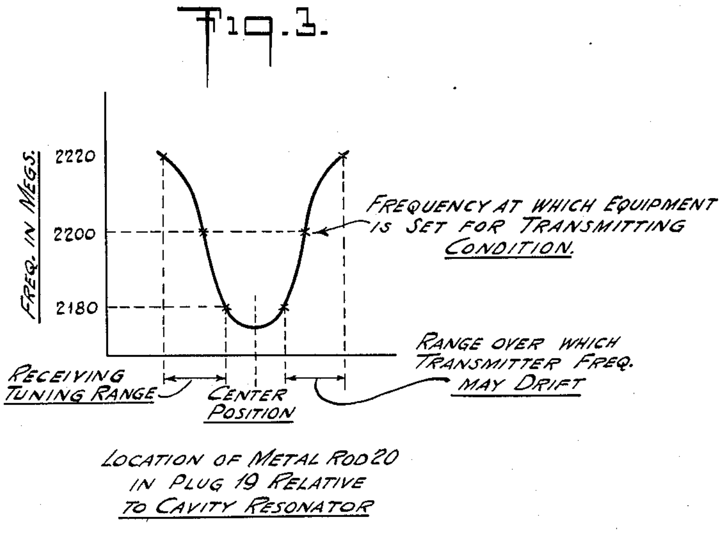
Figure 4A:
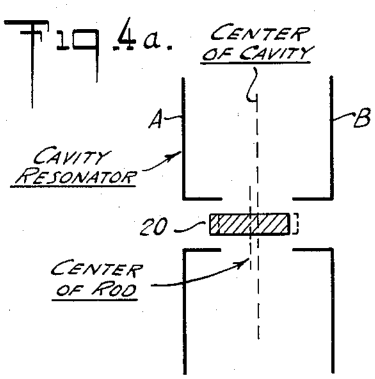
Figure 4C:
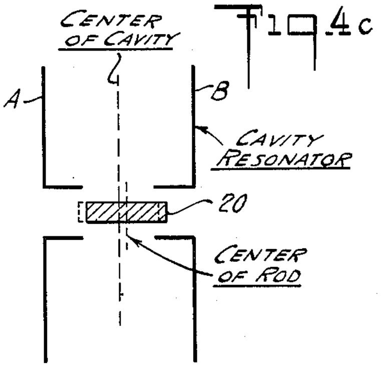
Figure 4B:
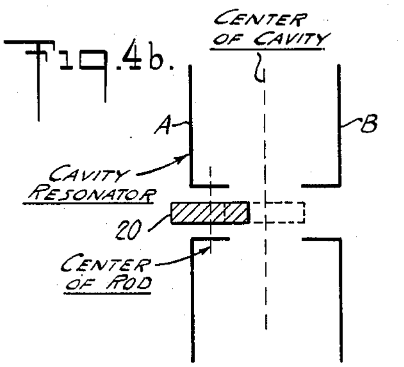
Figure 4D:
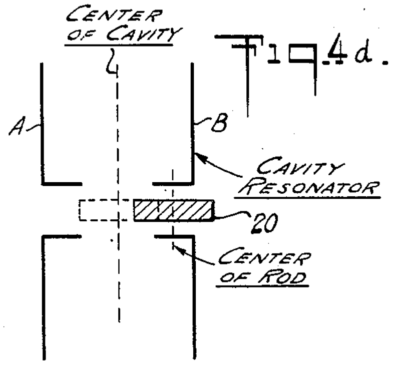

Fig. 2 schematically illustrates a transceiver circuit in which the apparatus of Fig. 1 is used;

Fig. 3 is a graph given in explanation of the operation of the frequency adjusting mechanism of the invention;

Figs. 4*a* and 4*b* show the limits of movement of the metallic rod adapted for movement between the side walls of the cavity resonator, for the receiving condition; and Figs. 4*c* and 4*d* show the limits of movement of the metallic rod adapted for movement between the side walls of the cavity resonator, for the transmitting condition.

The system of Fig. 1 shows the mechanical details of the ultra high frequency oscillator circuit employing the vacuum tube T and the associated cavity resonator 1. Resonator 1 has side walls A and B. The oscillator vacuum tube is of the "lighthouse" type, wherein the grid and anode connections protrude through the glass envelope in the form of parallel metallic rings spaced from one another along the length of the tube. These metallic rings or discs connect with the cavity resonator 1 on opposite sides of the cavity, as shown. The grid ring is labeled 6 and makes contact with one wall of the cavity resonator through spring contacts 22′ while the anode ring 7 makes contact with the opposite wall of the cavity resonator. The cavity resonator is provided, at the wall which accommodates the anode ring 7, with a metallic plate 21 apertured at the center. Metallic plate 21 is capacitively coupled to the rest of the wall of the cavity resonator through the mica spacer 12. The condenser formed between the metallic ring 21, to which the anode ring is directly connected, and the adjacent wall of the cavity resonator is a low impedance path for energy of the operating frequency, and thus it will be seen that the anode of the lighthouse tube is by-passed to the wall A of the cavity resonator for radio frequency energy. The oscillator tube T includes a metallic shell 5 and a tube socket 4. A suitable lighthouse tube of the type shown in the drawing, mentioned by way of example only, is the RCA type 446B triode. The tube T is held in place by pressure on base 4 by means of a rod 9 which forces the grid and plate rings 6 and 7, respectively, against their respective contacts in the cavity resonator 1.

The grid-cathode circuit of the oscillator includes a tunable coaxial line having an inner hollow conductor 3 and an outer hollow conductor 3′, both conductors being connected together at one end by a metallic ring 51 and a metallic end plate 14. The inner conductor 3 of the coaxial line is large enough to accommodate in its interior the envelope of the tube T, as shown. This inner conductor may be either cylindrical or square, and is provided at its free end with springs 22 which contact the metal shell 5. The outer conductor 3′ is preferably of round configuration for practical reasons, although if desired it may be square in form. Tuning of the coaxial resonator is achieved by means of capacity adjustments 10 and 10′ which varies the capacity across the coaxial line and thus changes the resonant frequency of the coaxial line. The metallic shell 5 is capacitively coupled to the cathode by means of a mica condenser built into the tube, and hence it will be obvious that the control grid and the cathode are connected by a resonating coaxial line. The cathode line is also provided with shorting springs 17 to prevent this line from resonating at an undesired low frequency without harming its usage as a three-quarter wavelength line.

The dimensions of cavity resonator 1 are such that the entire cavity is resonant at the desired frequency, with a standing wave one wavelength long in its short dimension. The frequency of the cavity resonator may be varied by means of adjustable spring end pieces which terminate the cavity in its long dimension and are designed to be moved a desired amount in the direction of the arrows, as shown in Fig. 1*a*, for permitting initial setting of the cavity resonator frequency.

The output circuit is in the form of a loop 45 within the interior of the cavity resonator, preferably entering the resonator on the same side as the tuning mechanism. This loop extends by way of a coaxial line 46 to a suitable antenna. Feedback energy to sustain the oscillation is obtained from the capacity coupling between the plate and cathode within the tube itself.

It will thus be seen that the frequency at which the 446B lighthouse tube T oscillates is determined principally by the adjustment of the cavity resonator 1, while the tendency to oscillate or the amount of feedback is determined by the tuning of the cathode coaxial line. If the latter adjustment remains fixed, it is therefore possible to change the oscillator frequency within a narrow frequency range by adjusting the resonator 1. The cavity resonator 1 is tuned by its end pieces 2, and in addition, it is provided with a capacity tuning adjustment which forms part of the automatic frequency compensation and receiver tuning arrangement now to be described.

The automatic frequency compensator in its essentials includes a relay 15 in the form of a solenoid controlling the movement of a plug 19, by way of magnetic armature 18. Relay 15 also controls a group of contacts 50 for switching the transceiver from the receiving condition to the transmitting condition, as shown in more detail in Fig. 2. Plug 19 is made of insulation material, such as styrol, and surrounds a small metallic rod 20, such as aluminum. The length of the rod 20 is slightly longer than the distance between the two bushings 44. The plug 19 is inserted in the cavity 1 and extends across both side walls thereof through bushings 44, at a location where the voltage gradient across the cavity is large. One end of plug 19 is secured to a leaf spring 23, in turn connected through rocker arm 24, to an arm 25 for actuating the rocker arm. In the receiving position of the system, the spring 26 exerts pressure on rocker arm 24 and leaf spring 23 to seat the plug 19 in the position shown in the drawing against the receiving tuning knob 27, the latter in turn threadedly engaging a support 28 mounted on the outside of the wall A of the cavity resonator. When the relay 15 is energized, which occurs during the transmitting condition of the system, the armature 18 will engage the actuating arm 25, thus turning rocker arm 24 and causing the leaf spring 23 to pull the plug 19 to the right against the opposing force of restoring spring 26. It will thus be seen that slidable plug 19 is rapidly movable under control of the relay 15, and that there is no obstacle to prevent the relatively free movement of the plug when the relay is actuated.

A stop 29 is provided for limiting the motion of the styrol rod 19 to the right by virtue of the flange 16. This stop controls the transmitter frequency and is fixedly set at one position during the alignment of the transceiver. A tuning knob 27 furnishes a stop for limiting the motion of the styrol rod 19 to the left. This stop controls the receiver frequency and is manually adjustable by the operator of the equipment.

The position of the styrol plug 19 with its enclosed shorter aluminum rod determines the frequency of the cavity resonator 1, ignoring for the moment the adjustment which can be made by the sliding end pieces 2. Movement of this plug 19 effects a capacity tuning adjustment of the cavity 1. The capacity added across the cavity resonator 1 will be a maximum when the rod 20 is located equidistant between the two bushings 44; and the added capacity will be a minimum when the styrol plug 19 is moved to either side so that no part of the aluminum rod is located within the cavity. The effect of moving the aluminum rod through the cavity from one side to the other is tabulated as follows:

| Location of rod 20 | Capacity | Frequency of Cavity Resonator 1 |
|---|---|---|
| (a) Outside cavity on side A. | Minimum | Maximum. |
| (b) Inside cavity on side A. | Greater than (a). Less than (c). | Lower than (a). Higher than (c). |
| (c) Inside cavity located symmetrically with respect to the sides of the cavity. | Maximum | Minimum. |
| (d) Inside cavity on side B. | Less than (c). More than (e) | Higher than (c). Lower than (e). |
| (e) Outside cavity on side B. | Minimum | Maximum. |

When the aluminum rod 20 is moved through the cavity 1, it will be noted that cavity tuning frequency passes twice through the same frequency range. This condition is used to provide independent tuning means for reception and transmission by providing two adjustable stops which limit the motion of the styrol rod. The stop 27 which limits the motion of the styrol rod 19 towards the cavity wall A (anode side) is the receiver tuning knob. This stop controls the receiver frequency. The stop 29 which limits the motion of the styrol rod 19 towards the cavity wall B (grid side) is a fixed adjustment, which can be moved only when the transmitter-receiver chassis is removed from its cover. This stop controls the transmitter-frequency. Relay 15 causes the styrol plug 19 to rest against the stop 27 when the equipment is "receiving," and against the stop 29 when "transmitting."

The adjustment in position of the aluminum rod 20 in the design and operation of the transceiver of the invention may be better understood from an inspection of the curve of Fig. 3 in conjunction with the views of Figs. 4*a* to 4*d*. In drawing the curve of Fig. 3, it has been assumed that the transceiver is designed to operate over a range of approximately 2100 to 2300 megacycles, with the operating frequency determined principally by the setting of the sliding end pieces 2. Minor adjustments in frequency may be made by changing the setting of the rod 20. For a fixed setting of the end pieces 2 the position of rod 20 in Fig. 4*a* shows the setting for the lower frequency limit for reception. This position may correspond to 2180 megacycles. The position of rod 20 in Fig. 4*b* shows the upper frequency limit for reception. This position may correspond to 2220 megacycles. The two positions of Figs. 4*a* and 4*b* correspond to the two extreme positions of the receiver tuning knob 27. The movement between these two extreme positions is fixed in the mechanical design. The position of rod 20 in Fig. 4*c* shows the setting for the lower frequency limit for transmission, while the position of rod 20 in Fig. 4*d* shows the upper frequency limit for transmission. In setting up the transceiver, the transmitter frequency is fixedly set by means of stop 29 so as to operate preferably at the center of the frequency range, in this case, at 2200 megacycles, although it could be set anywhere in the receiver tuning range. The reason for setting the transmitter frequency at the center of the frequency range is that the transmitter frequency unfortunately may drift in either direction from the mid frequency of 2200 megacycles, and it is desired that the remote transceiver still be able to receive this changed or drifting transmitter frequency. This permits maximum flexibility in using the transceiver of the invention.

An inspection of Figs. 4*a* and 4*c* will show that the center of the rod 20 is displaced from the center line of the cavity resonator for the lowest frequencies of operation, in both the receiving and transmitting positions. This is because it is desired that the frequency should change or progress in only one direction with rotation of the tuning knob and not reverse itself.

In using the transceiver of the invention, the operator can change only the receiving tuning adjustment by means of tuning knob 27. The transmitting tuning adjustment is fixed when the apparatus is set up and the operator cannot make any change in this adjustment without removing the chassis from its cover.

A suitable transceiving system employing the apparatus of Fig. 1 is illustrated in Fig. 2. The system of Fig. 2 employs the ultra high frequency oscillator T, both as a transmitting oscillator and as a super-regenerative detector. The same reference numerals employed in Fig. 1 have been used in Fig. 2 to identify the same parts. The cavity resonator tuner unit is labeled 1, the lighthouse tube is labeled T, the relay is labeled 15. A squelch oscillator 30, which may be an RCA 6C4 triode operating on a frequency of approximately 100 kilocycles when the transceiver is operating as a receiver, serves to anode modulate the ultra high frequency oscillator T at a 100 kilocycle rate for super-regenerative action. The relay 15 serves to condition the system for either receiving or transmitting under control of the switch S. Vacuum tubes 31 and 32, which may also be RCA 6C4 tubes, comprise two stages of audio frequency amplification having an input transformer 33 and an output transformer 34.

In the operation of the transceiver of Fig. 2, the system as shown in the drawing is in the receiving condition, in which case the contacts will be as indicated in the drawing and the relay 15 unenergized. Signals picked up by the antenna 100 are coupled to the cavity resonator 1, which in conjunction with the lighthouse tube T functions as a super-regenerative detector. The plate or anode P of the tube T is connected through relay switch contacts 59 and 60 to the tap of the secondary of the input transformer 33. The low side of the secondary winding is connected to the anode of the squelch oscillator tube 30, whereby the 100 kilocycle anode modulation of the oscillator tube T is effected. The audio voltage which is generated in the super-regenerative detector T is impressed across the part of the secondary winding of input transformer 33, which is connected between the anode of the squelch oscillator 30 and the oscillator T. The audio voltage is stepped up by the transformer action and is impressed across the volume control 40. A portion of the audio voltage is obtained at the arm of 40 and is fed through the contacts 53 and 52 in the relay switch to the grid of the first audio amplifier tube 31. This tube amplifies the audio voltage and through suitable coupling means feeds the amplified audio voltage to the control grid of the power amplifier 32. This tube further amplifies the audio voltage and through the output transformer 34 actuates the headset 70.

The squelch oscillator 30 is of the type commonly known as a Hartley oscillator, and operates at a frequency of 100 kilocycles. The plate voltage for the anode supply voltage for the squelch oscillator 30 and the oscillator T may be varied by means of the series resistor 41, thereby enabling the generator to select the optimum operating condition for action of the super-regenerative detector circuit.

Cathode bias for the oscillator tube T is provided across the series resistors 42 and 43.

When the button on the microphone is depressed, contacts D, E and F are connected to ground, and the following events will take place: The relay actuating coil 15 is permanently connected at one end of the coil to the 6 volt direct current filament supply voltage, so that when the other end of the coil is connected to ground through contacts C and D, the relay will be actuated and switch the transceiver to its transmit condition. The relay performs two functions: First, it changes the relay switch so that it contacts the other set of terminals and second, it moves the tuning plug within the cavity as explained above.

Depressing the button on the microphone also connects the free end of the microphone to ground. This action completes the microphone circuit, since the other side of the microphone is permanently connected to one side of the primary winding on the input transformer 33. Polarizing voltage for the microphone is provided from the 6 volts direct current filament supply through contacts 64 and 62 on the relay switch and the filter 74, 75. The audio voltages are therefore connected to the primary of the input transformer 33, in which they are stepped up and impressed across the modulation depth control 76. Part of this voltage is fed from the arm of the modulation depth control 76 through contacts 53 and 51 on the relay switch to the control grid of the audio amplifier 31, in which the signal is amplified and coupled to the control grid of the power amplifier 32. The anodes of the power amplifier 32 and the oscillator T are connected in parallel through the contacts 60 and 58 on the relay switch thus enabling the power amplifier 32 to anode modulate the oscillator T, when the system is actuated by the microphone.

The bias resistor 43, is shorted out through the contacts 56 and 54 on the relay switch, thus making the variable resistor 42 the only bias resistor. The variable resistor 42 may be used to control the strength of oscillation, and thereby the magnitude of the transmitted signal.

The coupling circuit, which for reception coupled the received signal to the oscillator cavity, will during transmission couple the oscillator signal to the antenna.

The squelch oscillator 30 will be inoperative during transmission, since a large resistor 45 is inserted in its cathode circuit.

What is claimed is:

1. In combination, an ultra high frequency oscillator having a cavity resonator as a frequency determining element, a switch and a relay having contacts under control of said switch, and means including said contacts for causing said oscillator and associated circuit to operate either as a transmitter or as a detector of signals, and a tuning element for said cavity resonator under control of the winding of said relay for automatically changing the tuning of said cavity resonator by a predetermined amount when the function of said oscillator is changed, said tuning element comprising a movable insert adapted substantially to bridge opposite walls of said resonator.

2. In combination, an ultra high frequency oscillator having a cavity resonator as a frequency determining element, a switch and a relay having contacts under control of said switch, and means including said contacts for causing said oscillator and associated circuit to operate either as a transmitter or as a detector of signals, and a tuning element for said cavity resonator under control of the winding of said relay for automatically changing the tuning of said cavity resonator by a predetermined amount when the function of said oscillator is changed, said tuning element comprising a movable insert adapted for insertion in said cavity resonator at a location where the voltage gradient across said resonator is relatively large.

3. In combination, an ultra high frequency oscillator having a cavity resonator as a frequency determining element, circuit means including a switch and a relay under control of said switch for operating said oscillator either as a transmitter or as a detector of signals, and a tuning element for said cavity resonator under control of the winding of said relay for automatically changing the tuning of said cavity resonator by a predetermined amount when the function of said oscillator is changed, said tuning element comprising a movable insert adapted for insertion in said cavity resonator, said insert being in the form of an insulating plug bridging said resonator and surrounding a metallic rod of smaller size and shorter length.

4. In combination, a cavity resonator, and means for tuning said resonator comprising a slidably movable insert bridging two walls of said resonator at a location where the voltage gradient is large for changing the frequency of operation, said insert comprising an insulation plug surrounding a metallic rod of shorter length, the length of said metallic rod being slightly longer than the distance between said two walls of said resonator, and a solenoid for moving said insert between two fixed positions.

5. An ultra high frequency transceiver comprising a lighthouse type of vacuum tube oscillator having a cavity resonator as a frequency determining element, a switch and a relay having contacts under control of said switch, means including said contacts for causing said oscillator and associated circuit to operate either as a transmitter or as a super-regenerative detector, and a movable insert for said cavity resonator under control of the winding of said relay for automatically changing the tuning of said cavity resonator by a predetermined amount when the function of said oscillator is changed, said insert bridging two opposite walls of said resonator at a location where the voltage gradient across the resonator is relatively large, said insert including a metallic element which is longer than the distance between said two opposite walls.

6. An ultra high frequency transceiver comprising a lighthouse type of vacuum tube oscillator operating to generate oscillations of the order of thousands of megacycles, said tube having physically spaced parallel grid and anode electrode terminals and a cathode, a cavity resonator having oppositely disposed substantially parallel walls, an aperture in at least one of said walls for enabling the anode terminal end of said vacuum tube to enter the interior of said resonator, means coupling one of said walls to said grid electrode terminal, means coupling the other of said walls to said anode electrode terminal, a coaxial line resonator located externally of said cavity resonator and coupled to the cathode and the grid terminal of said vacuum tube, a switch and circuit elements associated therewith including a relay for conditioning said vacuum tube oscillator to function either as a transmitter oscillator or as a super-regenerative detector, an insert comprising an insulation plug surrounding a metallic rod movable between oppositely disposed walls of said cavity resonator for changing the resonant frequency of said cavity resonator, said relay including a solenoid responsive to the operation of said switch for moving said insert between two predetermined positions.

7. An ultra high frequency transceiver comprising a lighthouse type of vacuum tube oscillator operating to generate oscillations of the order of thousands of megacycles, said tube having physically spaced parallel grid and anode electrode terminals and a cathode, a cavity resonator having oppositely disposed substantially parallel walls, an aperture in at least one of said walls for enabling the anode terminal end of said vacuum tube to enter the interior of said resonator, means coupling one of said walls to said grid electrode terminal, means coupling the other of said walls to said anode electrode terminal, a coaxial line resonator located externally of said cavity resonator and coupled to the cathode and the grid terminal of said vacuum tube, a switch and circuit elements including a relay having contacts associated therewith and means including said contacts for conditioning said vacuum tube oscillator and its associated circuit to function either as a transmitter oscillator or as a super-regenerative detector, a movable metallic rod for said cavity resonator supported between said same oppositely disposed walls of said cavity resonator for changing the resonant frequency of said cavity resonator, said metallic rod having a length slightly greater than the distance between said walls, said relay including a solenoid responsive to the operation of said switch for moving said insert between two predetermined positions.

8. The combination with an ultra high frequency oscillator having a resonant chamber for controlling the frequency of said oscillator, and a movable insert for said chamber, of means for operating said oscillator either as a transmitter or as a detector of signals, a relay having contacts under control of said first means for changing the position of said insert, said contacts and associated circuit means serving to change the operating condition of said combination as either a transmitter or a detector, and adjustable means for controlling the frequency of reception both above and below the frequency of transmission.

PAUL F. G. HOLST.
LOREN R. KIRKWOOD.

REFERENCES CITED

The following references are of record in the file of this patent:

UNITED STATES PATENTS

| Number | Name | Date |
|---|---|---|
| 2,018,569 | Pettengill et al. | Oct. 22, 1935 |
| 2,259,690 | Hansen et al. | Oct. 21, 1941 |
| 2,284,405 | McArthur | May 26, 1942 |
| 2,415,242 | Hershberger | Feb. 4, 1947 |
| 2,416,794 | Crosby | Mar. 4, 1947 |
| 2,417,542 | Carter | Mar. 18, 1947 |
| 2,425,495 | Trevor | Aug. 12, 1947 |
| 2,452,601 | Ranger | Nov. 2, 1948 |

FOREIGN PATENTS

| Number | Country | Date |
|---|---|---|
| 453,733 | Great Britain | Sept. 17, 1936 |
| 470,366 | Great Britain | Aug. 13, 1937 |
| 512,121 | Great Britain | Aug. 29, 1939 |
| 550,774 | Great Britain | Jan. 25, 1943 |